US012701364B2

(12) United States Patent
Nevill et al.

(10) Patent No.: US 12,701,364 B2
(45) Date of Patent: Aug. 4, 2026

(54) MULTI-LAYER BOARD ACTUATOR HAVING A PLANAR MAGNET AND VOICE COIL

(71) Applicant: Apple Inc., Cupertino, CA (US)

(72) Inventors: Stuart M. Nevill, Los Gatos, CA (US); Minghe Liu, San Jose, CA (US); Justin D. Crosby, Cupertino, CA (US); David S. Wilkes, Jr., San Jose, CA (US)

(73) Assignee: Apple Inc., Cupertino, CA (US)

( * ) Notice: Subject to any disclaimer, the term of this patent is extended or adjusted under 35 U.S.C. 154(b) by 450 days.

(21) Appl. No.: 18/365,108

(22) Filed: Aug. 3, 2023

(65) Prior Publication Data

US 2025/0048035 A1 Feb. 6, 2025

(51) Int. Cl.

| | |
|---|---|
| ***H04R 9/06*** | (2006.01) |
| ***H04R 7/04*** | (2006.01) |
| ***H04R 7/06*** | (2006.01) |
| ***H04R 7/10*** | (2006.01) |
| ***H04R 7/22*** | (2006.01) |
| ***H04R 9/04*** | (2006.01) |

(52) U.S. Cl.

CPC ............... *H04R 9/047* (2013.01); *H04R 7/04* (2013.01); *H04R 7/06* (2013.01); *H04R 7/10* (2013.01); *H04R 7/22* (2013.01); *H04R 9/046* (2013.01); *H04R 9/06* (2013.01); *H04R 2209/041* (2013.01)

(58) Field of Classification Search

CPC ... H04R 7/04; H04R 7/06; H04R 7/10; H04R 7/22; H04R 9/046; H04R 9/047; H04R 9/06; H04R 2209/041

See application file for complete search history.

(56) References Cited

U.S. PATENT DOCUMENTS

| | | | | |
|---|---|---|---|---|
| 3,141,071 A * | 7/1964 | Rich | H04R 9/047 | 381/408 |
| 3,873,784 A * | 3/1975 | Doschek | H04R 9/047 | 381/186 |

(Continued)

FOREIGN PATENT DOCUMENTS

| | | |
|---|---|---|
| CN | 201204675 Y | 3/2009 |
| WO | 2014119319 A1 | 8/2014 |

OTHER PUBLICATIONS

Je et al., "A Compact and Low-Cost MEMS Loudspeaker for Digital Hearing Aids", received from https://ieeexplore.ieee.org/document/5259716, IEEE Transactions On Biomedical Circuits and Systems, vol. 3, No. 5, Oct. 2009, 11 pages.

(Continued)

*Primary Examiner* — Huyen D Le

(74) *Attorney, Agent, or Firm* — Aikin & Gallant, LLP

(57) ABSTRACT

An actuator assembly comprising: a multi-layer board comprising a first side and a second side defining an actuation region having a thickness that is reduced relative to a remainder of the multi-layer board; a planar voice coil formed by a trace on at least one of the first side or the second side defining the actuation region; and a polarized magnet array having a magnetic field aligned to the planar voice coil to actuate the actuation region upon application of a voltage to the planar voice coil.

20 Claims, 5 Drawing Sheets

(56) References Cited

U.S. PATENT DOCUMENTS

| | | | | |
|---|---|---|---|---|
| 3,898,598 | A * | 8/1975 | Asahi | H04R 9/047 381/431 |
| 4,612,420 | A * | 9/1986 | Nieuwendijk | H04R 1/005 341/149 |
| 6,480,614 | B1 * | 11/2002 | Denda | H04R 7/04 381/191 |
| 2018/0211775 | A1 | 7/2018 | Salvatti et al. | |
| 2020/0053473 | A1 * | 2/2020 | Jacques | H04R 9/06 |

OTHER PUBLICATIONS

Krouglicof et al., "Development of a Novel PCB-Based Voice Coil Actuator for Opto-Mechatronic Applications", received from http://vigir.missouri.edu/~gdesouza/Research/Conference_CDs/IEEE_IROS_2013/media/files/1880.pdf, Nov. 3-7, 2013, 7 pages.

* cited by examiner

MULTI-LAYER BOARD ACTUATOR HAVING A PLANAR MAGNET AND VOICE COIL

FIELD

This application relates generally to an actuator that uses traces in an existing multi-layer board (MLB) and surface mounted magnets to actuate the MLB, more specifically a planar magnet loudspeaker actuator using traces in the existing MLB and surface mounted magnets for actuation. Other aspects are also described and claimed.

BACKGROUND

In modern consumer electronics, audio capability and haptic outputs are playing an increasingly larger role as improvements in digital audio signal processing and audio content delivery continue to happen. In this aspect, there is a wide range of consumer electronics devices that can benefit from improvements in acoustic output. For instance, smart phones include, for example, electro-acoustic transducers such as speakerphone loudspeakers, earpiece receivers and other actuators that can benefit from improved performance. Smart phones, however, do not have sufficient space to house much larger acoustic output devices. This is also true for some portable personal computers such as laptop, notebook, and tablet computers, and, to a lesser extent, desktop personal computers with built-in transducers. Many of these devices use what are commonly referred to as micro-speakers, micro-actuators, or micro-motor systems. Micro-speakers and/or actuators are a miniaturized version of a transducer, which use a moving coil motor to drive sound or other acoustic outputs. The moving coil motor may include a diaphragm, voice coil and magnet assembly positioned within a frame. The input of an electrical signal (e.g., an audio signal) to the moving coil motor causes the diaphragm to vibrate and output sound. Electrical connections to the voice coil for transmitting electrical signals (or any other associated moving components) typically consist of wires running from the voice coil to other stationary components. The wires may flex as the diaphragm vibrates, which in turn, without careful design and/or additional mitigations to reduce fatigue, can lead to wire breakage and reliability issues in the field.

SUMMARY

In some aspects, the disclosure is directed to an electrodynamic loudspeaker or actuator utilizing traces in an existing printed circuit board (PCB) of a multi-layer board (MLB) to create a planar voice spiral coil immersed in the magnetic field developed by a single axially polarized magnet adhered to the MLB to allow relative motion. If current is applied to the coil, the Lorentz force actuates the MLB, which in turn, radiates sound. In still further aspects, traces on several PCB layers in the MLB may be used to create more voice coil length and thus force. In other aspects, the axial magnet may be replaced by a Halbach (e.g., an arrangement of permanent magnets that augments the magnetic field on one side of the array while cancelling the field to near zero on the other side) or similar magnet array to create a more focused radial field on the coil. The MLB may be locally thinned or drilled to reduced mass and/or a flexible circuit board "flex" may be similarly repurposed. The magnets may be compliantly mounted to the MLB or a fixed surface (e.g., a wall of an enclosure within which the MLB is integrated) using a soft adhesive or rubber to allow relative motion. In still further aspects, local MLB bending modes may be identified and exploited to enhance output. For example, a local bending mode of the MLB may be identified and the coil may be formed at this local mode location so that application of a voltage excites this MLB mode such that the MLB forms an acoustic radiation surface with enhanced output. In addition, or alternatively, the coil may be formed in a flexible circuit board that is excited and used as the acoustic radiation surface. In still further aspects, the MLB may be within an enclosure having buttons or other features that can be actuated by the excitation of the MLB.

More specifically, one aspect is directed to an actuator assembly comprising: a multi-layer board comprising a first side and a second side defining an actuation region having a thickness that is reduced relative to a remainder of the multi-layer board; a planar voice coil formed by a trace on at least one of the first side or the second side defining the actuation region; and a polarized magnet array having a magnetic field aligned to the planar voice coil to actuate the actuation region upon application of a voltage to the planar voice coil. In some aspects, the actuation region includes a local bending mode that has a different bending mode than a remainder of the multi-layer board. In still further aspects, the reduced thickness at the actuation region is between one-half to one-third a thickness of the remainder of the multi-layer board. In some aspects, the planar voice coil includes a first planar voice coil formed by a trace on the first side and a second planar voice coil formed by a trace on the second side. In some aspects, a third planar voice coil is formed by a trace on a layer of the multi-layer board between the first side and the second side. In further aspects, the planar voice coil is a spiral voice coil confined to the actuation region. The polarized magnet array may be axially polarized and include a central magnet surrounded by a number of side magnets. The polarized magnet array may include an arrangement of permanent magnets having a spatially rotating pattern of magnetization. In some aspects, the polarized magnet array may be coupled to the first side or the second side of the multi-layer board. Still further, the polarized magnet array may be coupled to a fixed structure arranged along the first side of the multi-layer board and the second side faces a recessed region formed in the multi-layer board by the remainder of the multi-layer board. In some aspects, the multi-layer board may include a flexible circuit board.

Another aspect is directed to an electronic device including a device housing, a multi-layer printed circuit board coupled to the device housing, the multi-layer printed circuit board comprising a number of material layers and an actuation region formed by less than all of the number of material layers; a planar voice coil formed in the actuation region by a conductive trace of at least one of the number of material layers; a magnet array having a magnetic field aligned to the planar voice coil to actuate the actuation region upon application of a voltage to the planar voice coil; and a circuit coupled to the planar voice coil to apply the voltage to the planar voice coil. In some aspects, the actuation region has a local bending mode that has a different bending mode than a remainder of the multi-layer printed circuit board. The multilayer printed circuit board may include alternating conductive layers and non-conductive layers and the actuation region is formed by less than all of the non-conductive layers. In some aspects, the planar voice coil includes a first planar voice coil formed by a first conductive trace on a first side of the at least one material layer and a second planar voice coil formed by a second conductive trace on a second side of the at least one material layer. In addition, a third planar voice coil may be formed by a third conductive trace on another material layer coupled to the at least one material layer. In some aspects, the planar voice coil includes a spiral voice coil confined to the actuation region. In some aspects, the magnet array is axially polarized and includes a central magnet surrounded by a number of side magnets. In other aspects, the magnet array includes an arrangement of permanent magnets having a spatially rotating pattern of magnetization. In some aspects, the magnet array is coupled to the multilayer printed circuit board or the device housing. In still further aspects, the magnet array includes a first magnet coupled to a first side of the at least one material layer and a second magnet coupled to a second side of the at least one material layer.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect in this disclosure are not necessarily to the same aspect, and they mean at least one.

DETAILED DESCRIPTION

In this section we shall explain several preferred aspects of this disclosure with reference to the appended drawings. Whenever the shapes, relative positions and other aspects of the parts described are not clearly defined, the scope of the disclosure is not limited only to the parts shown, which are meant merely for the purpose of illustration. Also, while numerous details are set forth, it is understood that some aspects of the disclosure may be practiced without these details. In other instances, well-known structures and techniques have not been shown in detail so as not to obscure the understanding of this description.

The terminology used herein is for the purpose of describing particular aspects only and is not intended to be limiting of the disclosure. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
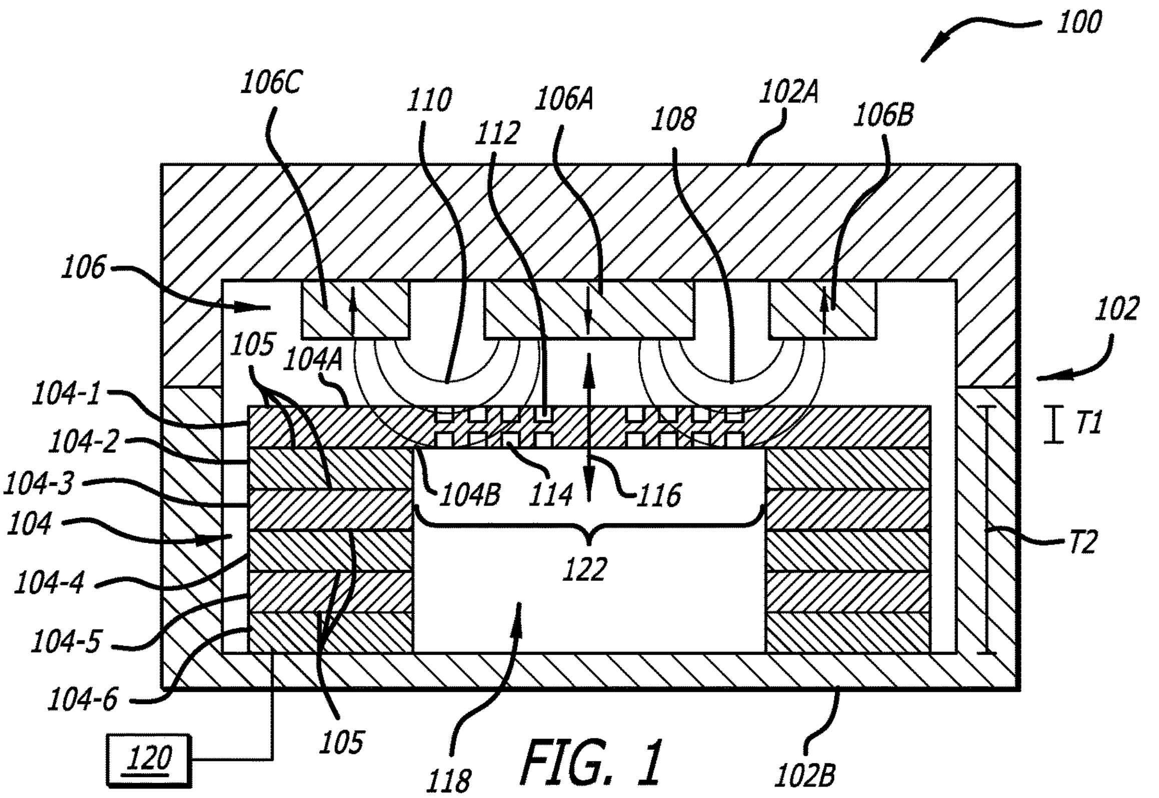
FIG. 1 illustrates a cross-sectional side view of one aspect of a transducer assembly.

FIG. 1 illustrates a cross-sectional side view of one aspect of a transducer assembly. Transducer assembly 100 may be, for example, an electro-acoustic transducer that converts electrical signals into audible or haptic signals that can be output from a device within which transducer assembly 100 is integrated. For example, transducer assembly 100 may be a micro-speaker such as an electrodynamic loudspeaker found within a smart phone, a laptop, notebook, tablet computer, portable time piece, or a controller for remotely controlling another electronic device (e.g., a television). Transducer assembly 100 may be enclosed within a housing or enclosure of the device within which it is integrated, or a module which is integrated into the housing or enclosure of the device. In some aspects, transducer assembly 100 may be considered a micro-speaker, micro-transducer or micro-actuator having a thickness of approximately 4 mm or less.

Transducer assembly 100 may include a frame, housing or enclosure 102, which encloses all of the components of transducer assembly 100. In some aspects, enclosure 102 may enclose only the transducer components (e.g., a transducer module) or may enclose all the device components (e.g., a remote control housing). Enclosure 102 may, in some cases, include a top enclosure portion 102A and a bottom enclosure portion 102B, between which a cavity for holding transducer components is formed. The top enclosure portion 102A and the bottom enclosure portion 102B may be considered fixed structures that can be snap-fit, welded, adhered or attached together using some other mechanism or process along their interfacing surfaces.

Transducer assembly 100 may further include an MLB 104 mounted within enclosure 102. Representatively, MLB 104 may be mounted to an interior surface or side of bottom enclosure portion 102B as shown. It is contemplated, however, that in other aspects, MLB 104 may be mounted to top enclosure portion 102A, or some other portion of enclosure 102. MLB 104 may be formed by a stack-up of alternating non-conductive layers (e.g., fiber reinforced plastic layers) 104-1 to 104-6 and conductive layers (e.g., copper layers) 105 that may be interconnected to route electrical signals to/from electronic components coupled to MLB 104. Representatively, MLB 104 may be a multi-layer printed circuit board made up of two or more PCB layers that together form a multilayer circuit for driving electronic components upon application of a voltage by circuit 120. In some aspects, layers 104-1 to 104-6 may be relatively rigid layers. In other aspects, one or more of layers 104-1 to 104-6 may be relatively flexible, for example, one or more of layers 104-1 to 104-6 may be flexible circuit or "flex" boards.

MLB 104 may further be configured such that portions of MLB 104 itself can be excited or actuated to generate sound and/or haptic outputs as previously discussed. Using the existing MLB 104 for sound or haptic output may, in turn, eliminate the need for a separate or additional acoustic device occupying space within enclosure 102. Representatively, in some aspects, in addition to a speaker and/or microphone typically within an electronic device for sound output/input, it may be desirable to have an additional sound or haptic output device in the system for other purposes, for example, for finding the device. MLB 104 already within device may be re-configured for this secondary purpose or function without using up any additional enclosure volume. In this aspect, MLB traces used to form, or within, conductive layers 105 may be re-routed or arranged into one more planar coils 112, 114 within a region 122 of MLB 104. For example, planar coils 112, 114 may be formed within or by traces within conductive layers 105 along top and bottom sides 104A, 104B of non-conductive layer 104-1. In this aspect, coils 112, 114 may be understood as being formed by two out of the six layers of power traces making up conductive layers 105. It should be understood, however, that in some aspects, additional coils may be formed by traces of additional conductive layers 105 as will be described in more detail in reference to FIG. 6. In some aspects, the traces within layers 105 may be re-routed or arranged to form planar spiral coils 112, 114 along sides 104A, 104B of layer 104-1 as will be described in more detail in reference to FIG. 3.

In addition, coils 112, 114 may be formed in region 122 of MLB 104 having a desired local bending mode found to improve efficiency. For example, MLB 104 may have certain regions (e.g., softer areas) that are more efficient to actuate and/or can be more easily excited than other regions. When the coils are therefore formed in these regions, MLB 104 may be more efficient to actuate and vibrate along arrow 116 and have improved sound or haptic outputs. Representatively, region 122 may be considered an excitable or actuation region found to have a local bending mode that is different than that of other regions, for example, a local bending mode of approximately 1.5-2.5 kHz, for example 2-2.5 kHz, or approximately 2.1 kHz. Coils 112, 114 formed in this region 122 can more efficiently actuate or excite MLB 104. Since coils 112, 114 are formed at region 122 found to have a particular local bending mode that excites easily, this local MLB mode may be exploited to improve efficiency and enhance the sound output.

In addition, in still further aspects, the thickness (T1) of the region 122 can be reduced relative to a thickness (T2) of the remainder of MLB 104 so MLB 104 can be driven more efficiently to generate sound. For example, region 122 may have a thickness (T1) that is less than a thickness (T2) of the remainder of MLB 104. In some aspects, thickness (T1) of region 122 may be one-third a thickness (T2) of the remainder of MLB 104. In other aspects, thickness (T1) of region 122 may be any amount less than the thickness (T2) of the remainder of MLB 104, for example, from one-sixth, one-quarter, one-half, to three-quarters a thickness of (T2). For example, in some aspects, MLB 104 may have an overall thickness (T1) of from about 500 to 600 microns (e.g., about 550 microns), and region 122 may have a thickness (T2) of from about 150 microns to 250 microns (e.g., about 180 microns). To achieve this, in some aspects, portions of one or more of layers 104-2 to 104-6 and 105 within region 122 below layer 104-1 may be removed. For example, in some aspects, region 122 may be formed by only layer 104-1 and the layers 105 above and below layer 104-1, and portions of each of layers 104-2 to 104-6 and 105 below region 122 of layer 104-1 may be cutout, drilled or otherwise removed. In this aspect, a pocket, channel or recessed region 118 is formed below region 122 formed by layer 104-1. For example, recessed region 118 may be formed by the bottom side 104B of layer 104-1 (and/or layer 105 along the bottom side 104B) and the edges of the remaining portions of layers 104-2 to 104-6. This thinned region 122 formed by layer 104-1 (and adjacent layers 105) can therefore be more easily actuated or excited than the surrounding MLB 104 made up of each of layers 104-1 to 104-6 and 105 to produce sound.

Assembly 100 further includes a magnet assembly 106 that is mounted within the enclosure and produces a magnetic field aligned with coils 112, 114. Representatively, magnet assembly 106 may include a number of magnets 106A, 106B, 106C that are arranged over coils 112, 114 as shown. For example, magnets 106A, 106B, 106C may be mounted or otherwise attached to an inner surface of top enclosure portion 102A. In some aspects, magnets 106A-C may be considered to all be within a same plane or have a relatively planar or co-planar arrangement. For example, magnet assembly 106 may have an overall thickness of, for example, around 1-2 millimeters, or about 1.3-1.5 millimeters. In some aspects, magnets 106A-C may be compliantly mounted to top enclosure portion 102A using a soft adhesive or rubber like mounting mechanism. Magnets 106A-C may be mounted such that there is a gap or space between magnets 106A-C and coils 112, 114. In some aspects, a clearance between magnets 106A-C and coils 112, 114 may be up to one millimeter, for example, 0.75 millimeters, or about 0.5 millimeters. Magnets 106A, 106B, 106C may be arranged relative to one another and coils 112, 114 such that they produce a magnetic field having flux lines 108, 110 that run through coils 112, 114. For example, magnets 106A-C may include a center magnet 106A aligned with a center of coils 112, 114. Magnets 106B. 106C may be side magnets arranged around (or radially outward relative to) the sides of center magnet 106A and radially outward to coils 112, 114. One or more of magnets 106A-C may be axially polarized and create flux lines 108, 110 which pass between the magnets and through coils 112, 114 as shown. In this aspect, when a current or voltage is applied by circuitry 120 to coils 112, 114, the Lorentz force actuates or excites the coils 112, 114 causing MLB 104 to move (or vibrate) in the direction of arrow 116 and radiate sound.

Figure 2:
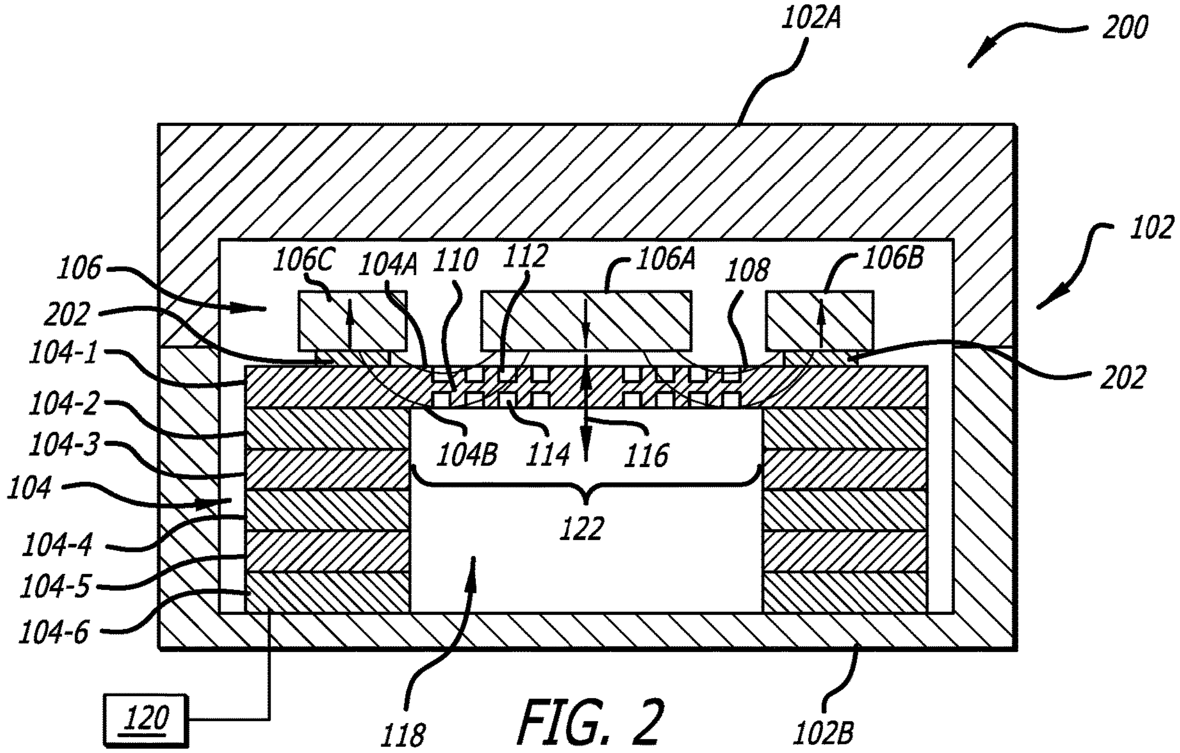
FIG. 2 illustrates a cross-sectional side view of another aspect of a transducer assembly.

FIG. 2 illustrates a cross-sectional side view of another aspect of a transducer assembly. Transducer assembly 200 may be similar to, and include the same components as, assembly 100 previously discussed in reference to FIG. 1. Representatively, transducer assembly 200 may include MLB 104 having coils 112, 114 formed therein and magnet assembly 106 mounted within enclosure 102. In assembly 200, however, magnet assembly 106 may be mounted or attached to MLB 104. For example, magnet assembly 106 may be compliantly mounted to the top side 104A of MLB layer 104-1 by a soft adhesive, rubber or other attachment mechanism 202. The attachment mechanism 202 may be any type of attachment mechanism that provides some clearance and allows for relative movement between magnet assembly 106 and MLB 104. In some aspects, center magnet 106A is attached to side magnets 106B and 106C such that only one or both of side magnets 106B-C (or center magnet 106A) are attached by attachment mechanism 202 to the top side 104A of MLB layer 104-1. In other aspects, each of magnets 106A-C are individually attached to the top side 104A of MLB layer 104A-1. Similar to the previously discussed assembly, one or more of magnets 106A-C may be axially polarized and create flux lines 108, 110 which pass between the magnets and through coils 112, 114 as shown. In this aspect, when a current or voltage is applied by circuitry 120 to coils 112, 114, the Lorentz force actuates or excites the coils 112, 114 causing MLB 104 to move (or vibrate) in the direction of arrow 116 and radiate sound.

Figure 3:
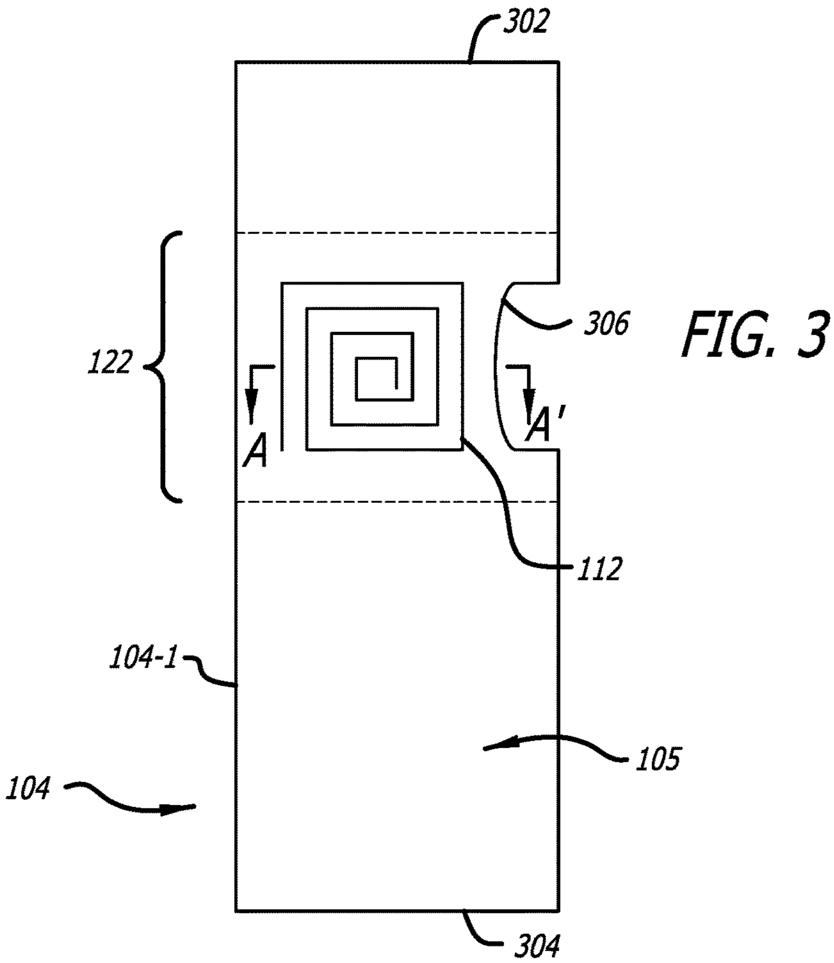
FIG. 3 illustrates a top plan view of a voice coil of the transducer assembly of FIG. 1 or FIG. 2.

Referring now to FIG. 3, FIG. 3 illustrates a top plan view of a voice coil of the transducer assembly of FIG. 1 or FIG. 2. Representatively, a top layer 104-1 of MLB 104 is shown having coil 112 formed therein by traces of the conductive layer 105. Coil 112 may be the same as coil 112 previously discussed in reference to FIGS. 1-2, which may be cross-sectional views along line A-A' of FIG. 3. From FIG. 3 it can be more clearly seen that coil 112 may be formed by a single trace arranged in a spiral like pattern beginning at a center region and extending radially outward along top layer 104-1. In some aspects, the spiral coil 112 may have a relatively square shape as shown, however, other shapes and sizes are contemplated. For example, the spiral coil 112 may be arranged in a round, elliptical, triangular or any other shaped spiral. In addition, spiral coil 112 should further be understood as having any number of turns (or corners) desired for maximum excursion and may only be limited by the size of region 122 and/or MLB 104. For example, spiral coil 112 may be confined to the area of the local bending mode region 122 and have any number of turns (or corners) suitable to fit within region 122. In other aspects, spiral coil 112 may have up to 14 or more turns (or corners) as shown in FIG. 3, for example, up to 20 turns, up to 30 turns, or more turns. In addition, in some aspects, the area occupied by spiral coil 112 may be up to approximately 10 mm×10 mm, up to approximately 20 mm×20 mm, up to approximately 30 mm×30 mm or more and only limited by the size of region 122 and/or MLB 104. Although not shown in this view, it may be understood that coil 114 on the bottom side 104B of layer 104-1 may have a same or different shape and size as coil 112 described in FIG. 3.

In addition, it can be seen from this view that coil 112 is formed within the desired local bending mode region 122. As previously discussed, region 122 of MLB 104 may have a desired local bending mode found to be easily excitable which, in turn, improves efficiency when using MLB 104 to radiate sound. For example, in some aspects, MLB 104 may have a substantially rectangular shape as shown, and region 122 may be closer to one end 302 than another end 304 of MLB 104. For example, region 122 may be offset relative to a center of MLB 104, or be entirely within one half of MLB 104. In addition, in some aspects, region 122 may be aligned within, or otherwise near, a cutout region 306 within a side of MLB 104. Cutout region 306 may result in a narrowed region of MLB 104 which may also enhance efficiency due to the reduced surface or mass needing to be excited within that region. It should be understood, however, that the location of the desired bending mode for optimal excitation (e.g., a local bending mode of approximately 1.5-2.5 kHz, for example 2-2.5 kHz, or approximately 2.1 kHz) may be at other locations along MLB 104.

Figure 4:
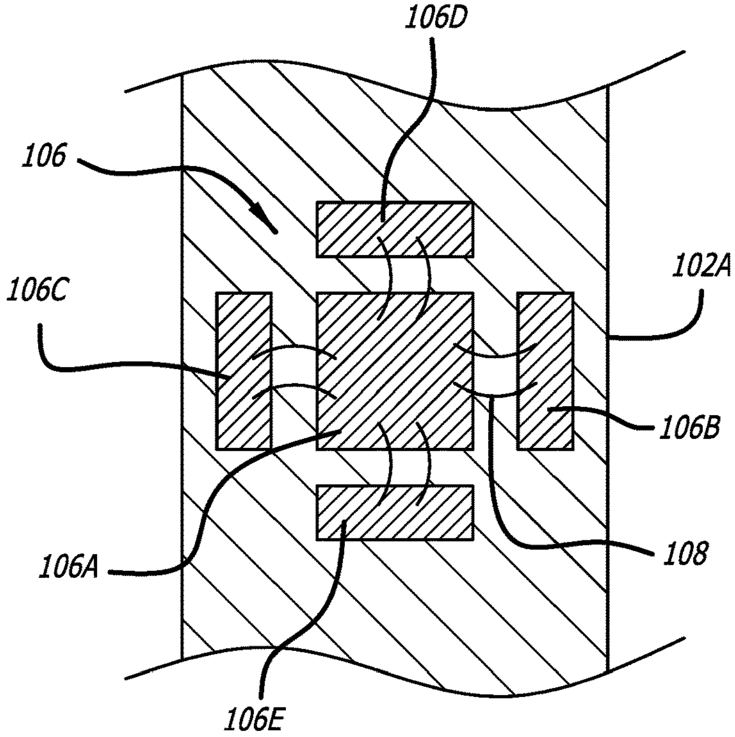
FIG. 4 illustrates a top plan view of a magnet assembly of the transducer assembly of FIG. 1 or FIG. 2.

Referring now to FIG. 4, FIG. 4 illustrates a top plan view of a magnet assembly of the transducer assembly of FIG. 1 or FIG. 2. Representatively, an interior surface of the top portion 102A of enclosure 102 is shown having magnet assembly 106 mounted thereto. Magnet assembly 106 may be the same as magnet assembly 106 previously discussed in reference to FIGS. 1-2, which may be cross-sectional views of magnet assembly 106 of FIG. 4. From FIG. 4 it can be more clearly seen that magnet assembly 106 may include a number of magnets 106A. 106B, 106C, 106D, 106E. Representatively, magnet assembly 106 may include a center magnet 106A surrounded by a number of side magnets 106B-E. In some aspects center magnet 106A may have a square shape, and side magnets 106B-E may be rectangular shaped magnets arranged around each of the sides of center magnet 106A. Magnets 106A-E may be axially polarized magnets such that flux line 108 run between center magnet 106A and each of the side magnets 106B-E. Magnets 106A-E may each be separately attached to enclosure 102, or may be attached to one another such that the attachment of one of magnets 106A-E to enclosure 102 attaches the entire magnet assembly 106 to enclosure 102. It should further be understood that while polygon shaped magnets 106A-E are shown, magnets 106A-E may have any shape and/or size suitable for producing a magnetic field with flux lines 108 across coil 112 (and coil 114) as previously discussed. In addition, magnet assembly 106 need not be limited to the magnet arrangement shown in FIG. 4.

Figure 5:
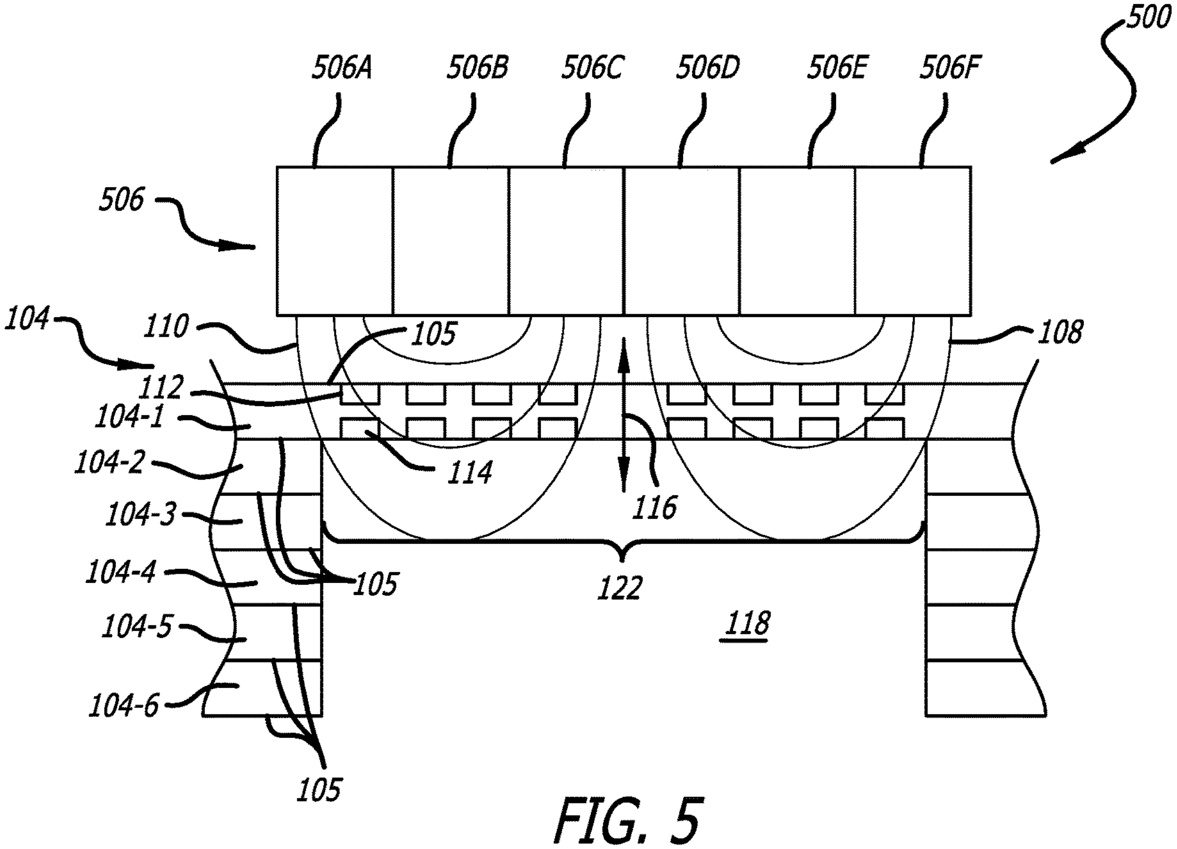
FIG. 5 illustrates a cross-sectional side view of another aspect of a transducer assembly.

Representatively, FIG. 5 illustrates a cross-sectional side view of an alternative magnet assembly configuration for the transducer assembly. Representatively, transducer assembly 500 may have the same components and operate in the same manner as previously discussed in reference to FIGS. 1-2. In this configuration, however, magnet assembly 506 is a Hablach magnet assembly including multiple magnets 506A. 506B, 506C, 506D, 506E and 506F arranged in an array as shown. Representatively, magnets 506A-F may be in a side-by-side arrangement that increases the magnetic field on one side of the array while cancelling the field to near zero on the other side of the array. This is achieved by having a spatially rotating pattern of permanent magnets 506A-F (on the front face; on the left, up, right, down) placed adjacent to each other, with similar poles touching. Similar to the previously discussed magnet assembly, magnet assembly 506 produces a magnetic field with flux lines 108, 110 passing through coils 112, 114. In this aspect, when a current or voltage is applied to coils 112, 114, the Lorentz force actuates or excites the coils 112, 114 causing MLB 104 to move (or vibrate) in the direction of arrow 116 and radiate sound. It should further be understood that while six magnets 506A-F are illustrated, any number of magnets could be used.

Figure 6:
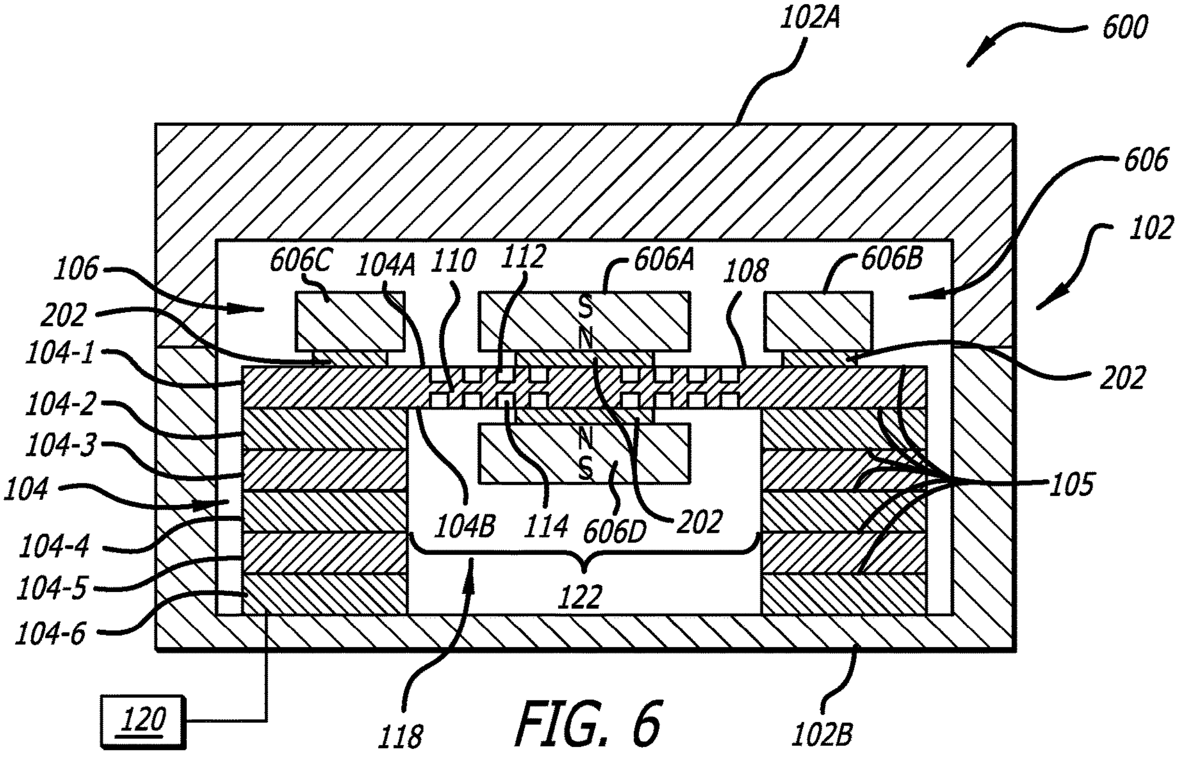
FIG. 6 illustrates a cross-sectional side view of another aspect of a transducer assembly.
Figure 7:
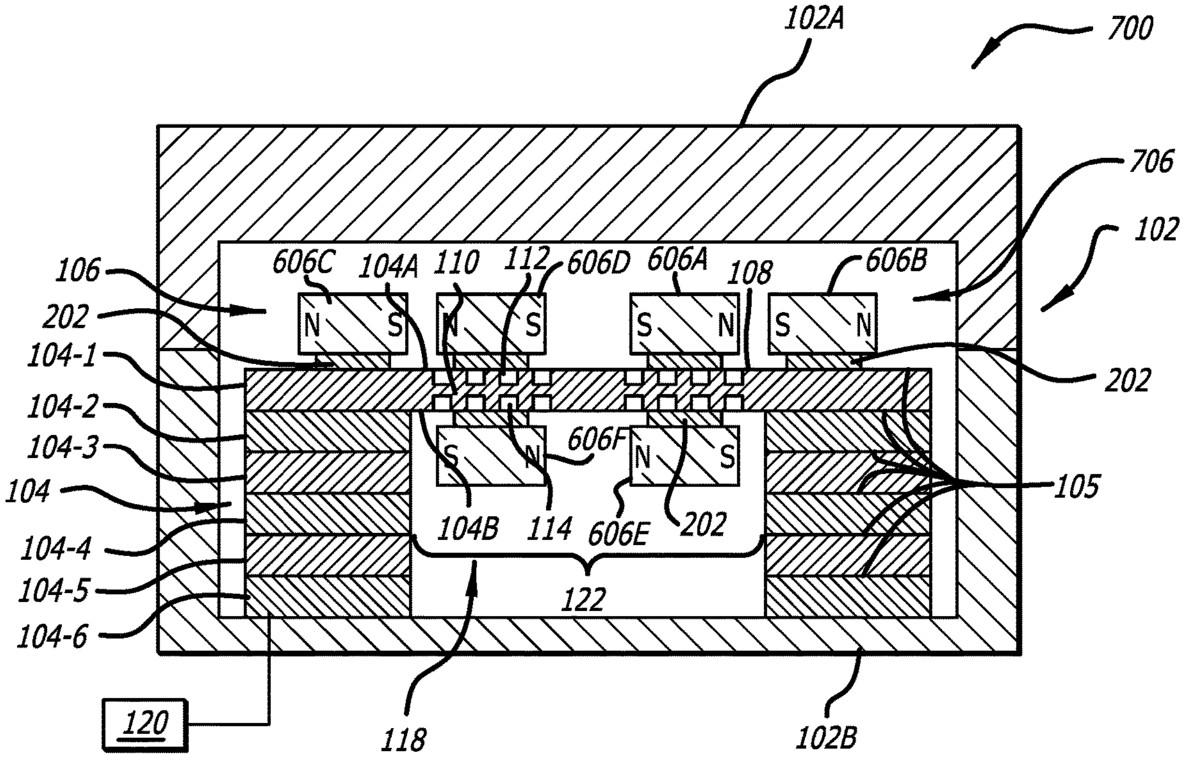
FIG. 7 illustrates a cross-sectional side view of another aspect of a transducer assembly.

Representatively, FIGS. 6-7 illustrate cross-sectional side views of an alternative double sided magnet assembly configuration for the transducer assembly. Representatively, FIG. 6 illustrates a transducer assembly 600 having similar components as previously discussed in reference to FIGS. 1-2. In this configuration, however, magnet assembly 606 is a double sided magnet assembly including multiple magnets 606A, 606B, 606C, and 606D arranged on opposing sides of MLB layer 104-1 of MLB 104 as shown. Representatively, magnets 606A-606C may be individually attached to a top side of MLB layer 104-1 by attachment mechanism 202.

Magnet 606D, on the other hand, may be attached to the bottom side of MLB layer 104-1 by attachment mechanism 202. Representatively, magnet 606D may be positioned within pocket or recessed region 118 below the actuation region 122. This configuration creates a push-pull/isodynamic assembly that may generate more flux for the same amount of magnetic material. In addition, the magnetic field may be more linear and/or consistent over the thickness of the MLB 104 such that the motion of MLB 104 will be more linear and less distorted. In this aspect, when a current or voltage is applied to coils 112, 114, the Lorentz force actuates or excites the coils 112, 114 causing a push/pull movement and/or vibration of MLB 104 that generates a sound output.

Referring now to FIG. 7, FIG. 7 illustrates a transducer assembly 700 having similar components as previously discussed in reference to FIGS. 1-2. In this configuration, however, magnet assembly 706 is a double sided magnet assembly including multiple magnets 606A, 606B, 606C, 606D, 606E and 606F arranged on opposing sides of MLB layer 104-1 of MLB 104 as shown. Representatively, magnets 606A-606D may be individually attached to a top side of MLB layer 104-1 by attachment mechanism 202. Magnets 606E-606F, on the other hand, may be attached to the bottom side of MLB layer 104-1 by attachment mechanism 202. Representatively, magnets 606E-606F may be positioned within pocket or recessed region 118 below the actuation region 122. This configuration creates a push-pull/isodynamic assembly that may generate more flux for the same amount of magnetic material and less distortion to vibrate MLB 104 as previously discussed. In addition, it should be understood that while magnets 606A-606F are shown attached to one of the MLB layers (e.g., layer 104-1), one or more of magnets 606A-606F could also be attached to a portion of enclosure 102, for example, as shown in FIG. 1. In addition, although one or more of magnets 606A-606F are shown positioned within pocket 118, they could overlap the pocket and/or be mounted another portion of MLB 104.

Figure 8:
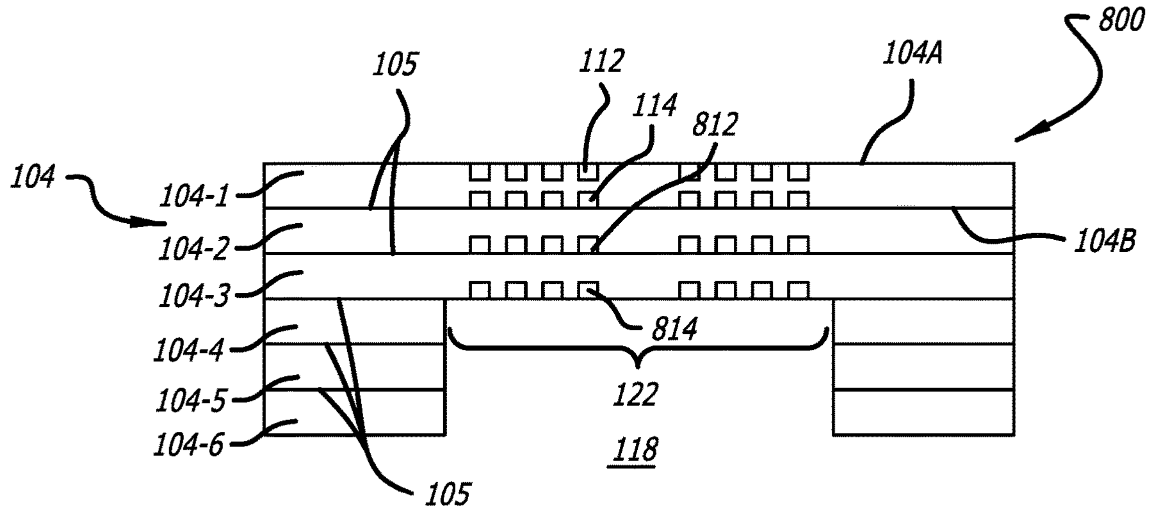
FIG. 8 illustrates a cross-sectional side view of another aspect of a transducer assembly.

FIG. 8 illustrates a cross-sectional side view of another aspect of a transducer assembly. Representatively, transducer assembly 800 may have the same components and operate in the same manner as previously discussed in reference to FIGS. 1-2. MLB 104 is shown in FIG. 8 and the remaining previously discussed components are omitted, however, for ease of understanding. MLB 104 is shown including a stack up of alternating non-conductive layers 104-1 to 104-6 and conductive layers 105. Coils 112, 114 are formed using traces from conductive layers 105 formed along the top and bottom sides 104A-B of non-conductive layer 104-1. From this view, it can further be understood that additional coils 812, 814 may be formed in additional conductive layers 105. Representatively, traces within conductive layer 105 between non-conductive layers 104-2 and 104-3 may be rerouted to form coil 812, and traces within conductive layer 105 between non-conductive layers 104-2 and 104-3 may be rerouted to form coil 814. In this aspect, it may be understood that traces within several MLB layers can be used to create more voice coil length and thus force for improved output. It should further be understood that although four coils 112, 114, 812, 814 are illustrated, any number of coils may be formed depending on the desired force and output. In addition, since coils 112, 114, 812, 814 are formed within conductive layers 105 along non-conductive layers 104-1 to 104-3, non-conductive layers 104-1 to 104-3 remain within the local bending mode region 122. In this aspect, only layers 104-4 to 104-6 are cutout or drilled to form the channel, pocket or recessed region 118 below the actuation region 122. The region 122 that is excited or actuated using coils 112, 114, 612, 614 may therefore also be understood as being thicker than previously discussed (e.g., region 122 has a thickness greater than thickness (T1) of region 122 of FIGS. 1-2). Region 122 may, however, still have a thickness that is less than the overall thickness (T2) of MLB 104.

Figure 9:
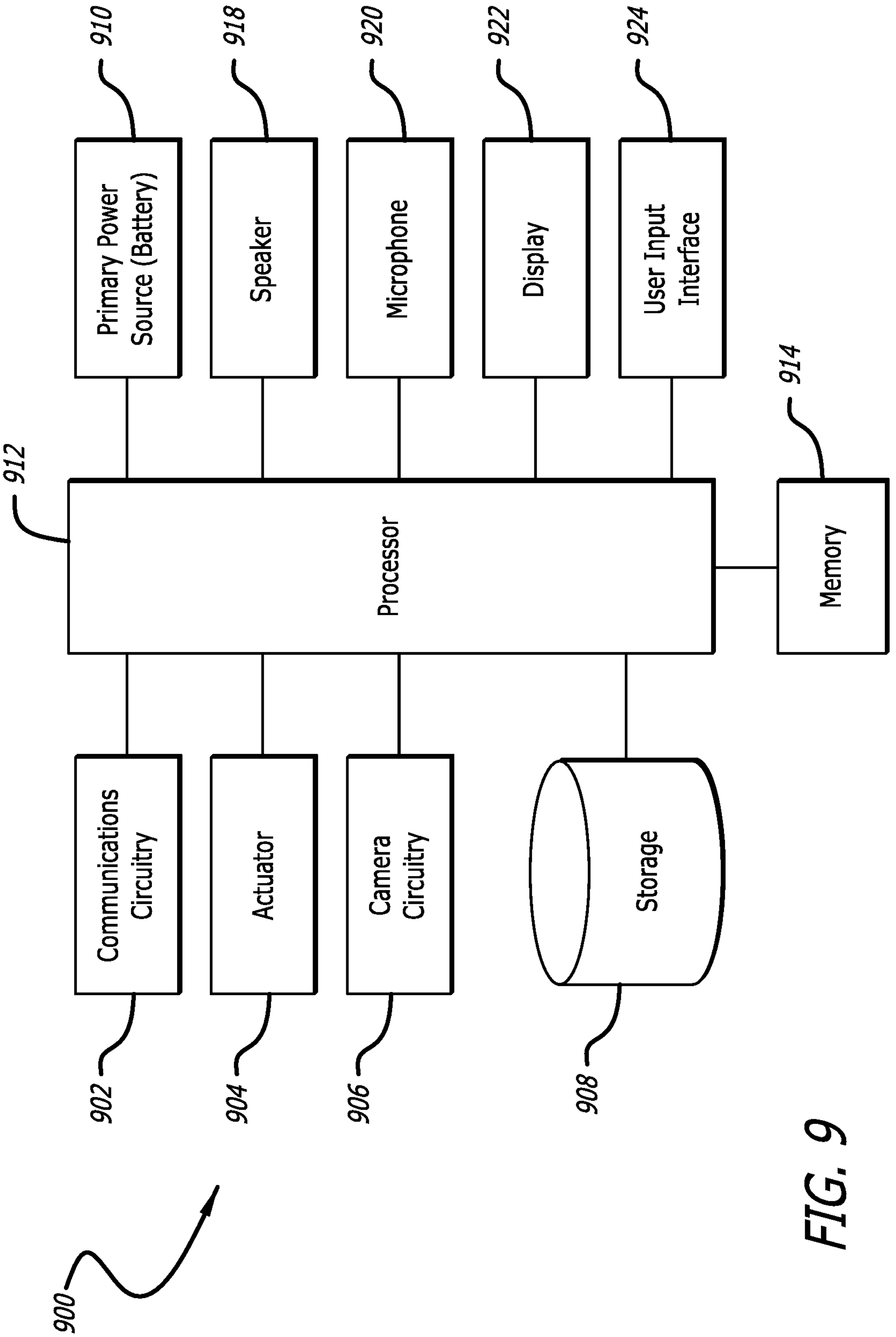
FIG. 9 illustrates a block diagram of some of the constituent components of an aspect of an electronic device in which one or more aspects may be implemented.

FIG. 9 illustrates a block diagram of some of the constituent components of an aspect of an electronic device in which one or more aspects may be implemented. Device 900 may be any one of several different types of consumer electronic devices. For example, the device 900 may be any transducer-equipped device, such as a cellular phone, a smart phone, a media player, a tablet-like portable computer, a controller or any other device which may benefit from sound output.

In this aspect, electronic device 900 includes a processor 912 that interacts with camera circuitry 906, actuator 904, storage 908, memory 914, display 922, and user input interface 924. Main processor 912 may also interact with communications circuitry 902, primary power source 910, actuator 904, speaker 918 and microphone 920. Speaker 918 and/or actuator 904 may be a micro speaker or actuator such as that described in reference to FIGS. 1-8. The various components of the electronic device 900 may be digitally interconnected and used or managed by a software stack being executed by the processor 912. Many of the components shown or described here may be implemented as one or more dedicated hardware units and/or a programmed processor (software being executed by a processor, e.g., the processor 912).

The processor 912 controls the overall operation of the device 900 by performing some or all of the operations of one or more applications or operating system programs implemented on the device 900, by executing instructions for it (software code and data) that may be found in the storage 908. The processor 912 may, for example, drive the display 922 and receive user inputs through the user input interface 924 (which may be integrated with the display 922 as part of a single, touch sensitive display panel). In addition, processor 912 may send an audio signal to speaker 918 and/or actuator 904 to facilitate operation of speaker 918 and/or actuator 904.

Storage 908 provides a relatively large amount of "permanent" data storage, using nonvolatile solid state memory (e.g., flash storage) and/or a kinetic nonvolatile storage device (e.g., rotating magnetic disk drive). Storage 908 may include both local storage and storage space on a remote server. Storage 908 may store data as well as software components that control and manage, at a higher level, the different functions of the device 900.

In addition to storage 908, there may be memory 914, also referred to as main memory or program memory, which provides relatively fast access to stored code and data that is being executed by the processor 912. Memory 914 may include solid state random access memory (RAM), e.g., static RAM or dynamic RAM. There may be one or more processors, e.g., processor 912, that run or execute various software programs, modules, or sets of instructions (e.g., applications) that, while stored permanently in the storage 908, have been transferred to the memory 914 for execution, to perform the various functions described above.

The device 900 may include communications circuitry 902. Communications circuitry 902 may include components used for wired or wireless communications, such as two-way conversations and data transfers. For example, communications circuitry 902 may include RF communications circuitry that is coupled to an antenna, so that the user of the device 900 can place or receive a call through a wireless communications network. The RF communications circuitry may include a RF transceiver and a cellular baseband processor to enable the call through a cellular network. For example, communications circuitry 902 may include Wi-Fi communications circuitry so that the user of the device 900 may place or initiate a call using voice over Internet Protocol (VOIP) connection, transfer data through a wireless local area network.

The device may include a microphone 920. Microphone 920 may be an acoustic-to-electric transducer or sensor that converts sound in air into an electrical signal. The microphone circuitry may be electrically connected to processor 912 and power source 910 to facilitate the microphone operation (e.g., tilting).

The device 900 may further include a motion sensor, also referred to as an inertial sensor, that interacts with processor 912 and may be used to detect movement of the device 900. The motion sensor may include a position, orientation, or movement (POM) sensor, such as an accelerometer, a gyroscope, a light sensor, an infrared (IR) sensor, a proximity sensor, a capacitive proximity sensor, an acoustic sensor, a sonic or sonar sensor, a radar sensor, an image sensor, a video sensor, a global positioning (GPS) detector, an RF or acoustic doppler detector, a compass, a magnetometer, or other like sensor. For example, the motion sensor may be a light sensor that detects movement or absence of movement of the device 900, by detecting the intensity of ambient light or a sudden change in the intensity of ambient light. The motion sensor generates a signal based on at least one of a position, orientation, and movement of the device 900. The signal may include the character of the motion, such as acceleration, velocity, direction, directional change, duration, amplitude, frequency, or any other characterization of movement. The processor 912 receives the sensor signal and controls one or more operations of the device 900 based in part on the sensor signal.

The device 900 also includes camera circuitry 906 that implements the digital camera functionality of the device 900. One or more solid state image sensors are built into the device 900, and each may be located at a focal plane of an optical system that includes a respective lens. An optical image of a scene within the camera's field of view is formed on the image sensor, and the sensor responds by capturing the scene in the form of a digital image or picture consisting of pixels that may then be stored in storage 908. The camera circuitry 906 may also be used to capture video images of a scene.

Device 900 also includes primary power source 910, such as a built in battery, as a primary power supply.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. For example, in some aspects, the transducer assembly disclosed herein may be coupled to, or otherwise positioned near, a button or other input device associated with the enclosure. In this aspect, actuation or excitation of the MLB transmits a haptic or sound output to the button that may, for example, provide an alert or other output to the user. The description is thus to be regarded as illustrative instead of limiting. In addition, to aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. An actuator assembly comprising:
- a multi-layer printed circuit board comprising a first side and a second side defining an actuation region having a first thickness that is reduced relative to a second thickness of the multi-layer printed circuit board;
- a planar voice coil formed by a trace on at least one of the first side or the second side of the multi-layer printed circuit board defining the actuation region; and
- a polarized magnet array having a magnetic field aligned to the planar voice coil to actuate the actuation region upon application of a voltage to the planar voice coil.

2. The actuator assembly of claim 1 wherein the actuation region comprises a local bending mode that has a different bending mode than a portion of the multi-layer printed circuit board having the second thickness.

3. The actuator assembly of claim 1 wherein the reduced thickness at the actuation region is between one-half to one-third of the second thickness of the multi-layer printed circuit board.

4. The actuator assembly of claim 1 wherein the planar voice coil comprises a first planar voice coil formed by a trace on the first side and a second planar voice coil formed by a trace on the second side.

5. The actuator assembly of claim 4 wherein a third planar voice coil is formed by a trace on a layer of the multi-layer printed circuit board between the first side and the second side.

6. The actuator assembly of claim 1 wherein the planar voice coil comprises a spiral voice coil confined to the actuation region.

7. The actuator assembly of claim 1 wherein the polarized magnet array is axially polarized and comprises a central magnet surrounded by a number of side magnets.

8. The actuator assembly of claim 1 wherein the polarized magnet array comprises an arrangement of permanent magnets having a spatially rotating pattern of magnetization.

9. The actuator assembly of claim 1 wherein the polarized magnet array is coupled to the first side or the second side of the multi-layer printed circuit board.

10. The actuator assembly of claim 1 wherein the polarized magnet array is coupled to a fixed structure arranged along the first side of the multi-layer printed circuit board and the second side faces a recessed region formed in the multi-layer printed circuit board.

11. The actuator assembly of claim 1 wherein the multi-layer printed circuit board comprises a flexible multi-layer printed circuit board.

12. An electronic device comprising:
- a device housing;
- a multi-layer printed circuit board coupled to the device housing, the multi-layer printed circuit board comprising a number of material layers and an actuation region formed by less than all of the number of material layers;
- a planar voice coil formed in the actuation region by a conductive trace of at least one of the number of material layers of the multi-layer printed circuit board;
- a magnet array having a magnetic field aligned to the planar voice coil to actuate the actuation region upon application of a voltage to the planar voice coil; and
- a circuit coupled to the planar voice coil to apply the voltage to the planar voice coil.

13. The electronic device of claim 12 wherein the actuation region comprises a local bending mode of from about 1.5 kHz to about 2.5 kHz and that is different than a bending mode of another region of the multi-layer printed circuit board.

14. The electronic device of claim 12 wherein the multi-layer printed circuit board comprises alternating conductive layers and non-conductive layers and the actuation region is formed by less than all of the non-conductive layers.

15. The electronic device of claim 12 wherein the planar voice coil comprises a first planar voice coil formed by a first conductive trace on a first side of the at least one material layer and a second planar voice coil formed by a second conductive trace on a second side of the at least one material layer.

16. The electronic device of claim 15 wherein a third planar voice coil is formed by a third conductive trace on another material layer coupled to the at least one material layer.

17. The electronic device of claim 12 wherein the planar voice coil comprises a spiral voice coil confined to the actuation region.

18. The electronic device of claim 12 wherein the magnet array is axially polarized and comprises a central magnet surrounded by a number of side magnets.

19. The electronic device of claim 12 wherein the magnet array comprises an arrangement of permanent magnets having a spatially rotating pattern of magnetization.

20. The electronic device of claim 12 wherein the magnet array comprises a first magnet coupled to a first side of the at least one material layer and a second magnet coupled to a second side of the at least one material layer.

* * * * *